ns Patent [19]

Nakanishi et al.

[11] 4,312,309
[45] Jan. 26, 1982

[54] HELICALLY-SHAPED INTAKE PORT OF AN INTERNAL COMBUSTION ENGINE

[75] Inventors: Kiyoshi Nakanishi; Takeshi Okumura, both of Susono, Japan

[73] Assignee: Toyota Jidosha Kogyo Kabushiki Kaisha, Toyota, Japan

[21] Appl. No.: 40,046

[22] Filed: May 17, 1979

[30] Foreign Application Priority Data

Sep. 25, 1978 [JP] Japan .................. 53-116664

[51] Int. Cl.³ .............................................. F01L 3/00
[52] U.S. Cl. .............................. 123/188 M; 123/306
[58] Field of Search ............. 123/188 M, 52 M, 30 C, 123/306

[56] References Cited

U.S. PATENT DOCUMENTS 3,020,896  2/1962  Meurer et al. ................. 123/188 M
3,273,551  9/1966  Julien et al. .................... 123/188 M
3,890,949  6/1975  Elsbett et al. .................. 123/188 M

FOREIGN PATENT DOCUMENTS 1912766 10/1970  Fed. Rep. of Germany ... 123/188 M
2242383  3/1974  Fed. Rep. of Germany ... 123/188 M
2643648  7/1977  Fed. Rep. of Germany ... 123/188 M
 192366 11/1964  Sweden , .......................... 123/188 M
1259484  1/1972  United Kingdom ........... 123/188 M Primary Examiner—Craig R. Feinberg
Assistant Examiner—W. R. Wolfe
Attorney, Agent, or Firm—Kenyon & Kenyon

[57] ABSTRACT

Helically-shaped intake port comprising a helical portion and an inlet passage portion which is tangentially connected to the helical portion and is slightly curved. The intake valve is arranged at the open outlet end of the helical portion. The upper wall of the helical portion extends to a helix terminating portion from the connecting position, and the inlet passage portion is connected to the helical portion. The height between the outlet open end and the upper wall of the helical portion, which is located at the helix terminating portion, is equal to or larger than the diameter of the outlet open end.

12 Claims, 10 Drawing Figures

_4,312,309_

HELICALLY-SHAPED INTAKE PORT OF AN INTERNAL COMBUSTION ENGINE

DESCRIPTION OF THE INVENTION

The present invention relates to a helically-shaped intake port of an internal combustion engine.

Particularly in a compression-ignition type internal combustion engine, in order to create a strong swirl motion in the combustion chamber of an engine at the time of the intake stroke, a helically-shaped intake port comprising a substantially straight inlet passage portion and a helical portion is used. However, even if such a helically-shaped intake port is applied to a spark-ignition type gasoline engine and, in addition if, a slight change of the construction of the helically-shaped intake port is effected so as to create a swirl motion of the strength necessary to obtain a good combustion when the engine is operating under a light load, since the engine speed normally used in a gasoline engine is considerably greater than that normally used in a compression-ignition type engine, the flow resistance to which the mixture flowing in the helically-shaped intake port is subjected becomes large in a gasoline engine. As a result, the volumetric efficiency is reduced when the gasoline engine is operating at a high speed under a heavy load.

An object of the present invention is to provide a helically-shaped intake port having a novel construction which is capable of creating a strong swirl motion in the combustion chamber when the engine is operating under a light load, while ensuring a high volumetric efficiency when the engine is operating at a high speed under a heavy load.

According to the present invention, there is provided a helically-shaped intake port for an internal combustion engine, which comprises a helical portion having an open outlet end and an intake valve arranged at the outlet end, the helical portion being defined by an upper wall and a peripheral side wall which extends circumterentially about an axis of the intake valve. An inlet passage portion trangentially connected to said helical portion and having an inlet open end is defined by an upper wall, a bottom wall, a first side wall arranged at a position near the axis of the intake valve, and a second side wall arranged at a position remote from the axis of the intake valve and connected to the peripheral side wall of the helical portion. The upper wall of the helical portion extends to a helix terminating portion from the connecting portion and is connected to the inlet passage portion. The height between the outlet end and the upper wall of the helical portion, located at said helix terminating portion is equal to or larger than the diameter of the outlet end. from the description of a preferred embodiment of the invention set forth below, together with the accompanying drawings.

DESCRIPTION OF A PREFERRED EMBODIMENT

Figure 1:
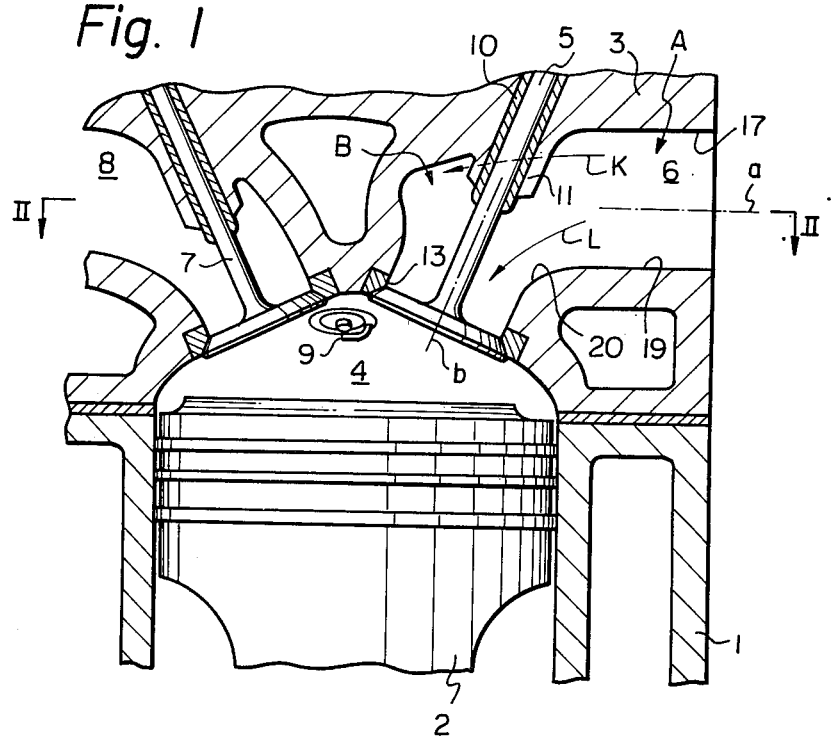
FIG. 1 is a cross-sectional side view of an internal combustion engine equipped with a helically-shaped intake port according to the present invention.
Figure 2:
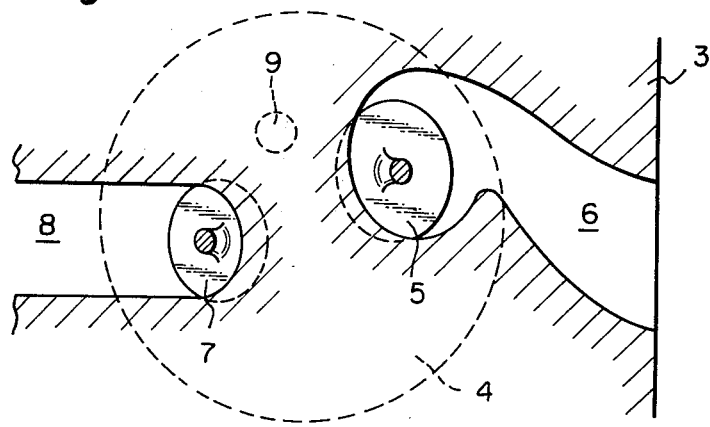
FIG. 2 is a cross-sectional plan view taken along the line II—II in FIG. 1.
Figure 3:
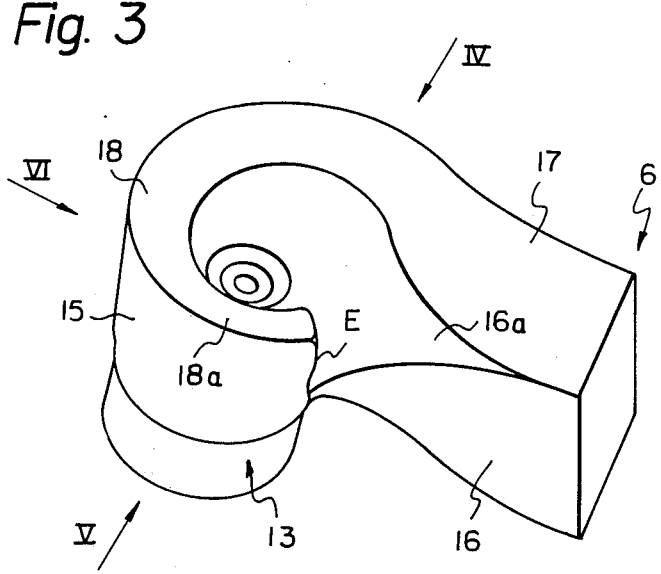
FIG. 3 is a perspective view of a helical shaped intake port schematically illustrating the helical shaped intake port illustrated in FIG. 1.

Referring to FIGS. 1 and 2, there is illustrated a cylinder block 1, a piston 2 reciprocally movable in the cylinder block 1, a cylinder head 3 fixed onto the cylinder block 1 and a combustion chamber 4 formed between the piston 2 and the cylinder head 3. An intake valve 5 is located in a helically-shaped intake port 6 formed in the cylinder head, along with an exhaust valve 7, an exhaust port 8, and a spark plug 9. As is illustrated in FIG. 1, a cylindrical projection 11 projects downwardly for supporting a valve guide 10 and is formed in one piece on the upper inner wall of the helically-shaped intake port 6, and the tip of the valve guide 10 projects from the tip of the cylindrical projection 11.

At the time of the intake stroke, the mixture formed in the carburetor (not shown) is introduced into the combustion chamber 4 via the helically-shaped intake port 6 and the intake valve 5 and is ignited by the spark plug 9 at the end of the compression stroke.

Figure 4:
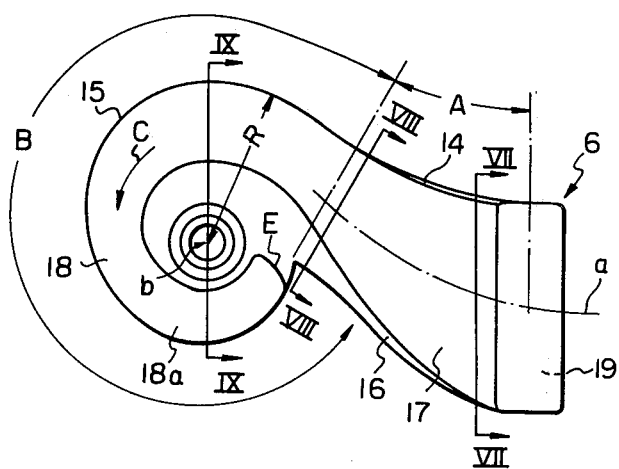
FIG. 4 is a plan view in the direction of the arrow IV in FIG. 3.

FIGS. 3 through 6 schematically illustrate the shape of the helically-shaped intake port 6 illustrated in FIG. 1. As is illustrated in FIG. 4, the helically-shaped intake port 6 according to the present invention comprises an inlet passage portion A and a helical portion B, the longitudinal central axis of the inlet passage portion A being slightly curved. The inlet end of the open inlet passage portion A has a rectangular cross-section as illustrated in FIG. 7, and the mixture outlet portion 13 of the helical portion B has a cylindrical inner wall which extends circumferentially about the helix axis b of the helical portion B.

As illustrated in FIG. 1, the helix axis b, which is the axis of the intake valve 5, is inclined by approximately 23° with respect to the axis of the cylinder, and the inlet passage portion A extends substantially horizontally. The side wall 14 of the inlet passage portion A, which is located remote from the helix axis b, is arranged so as to be substantially vertical and is smoothly connected to the side wall 15 of the helical portion B, which extends circumferentially about the helix axis b.

Figure 6:
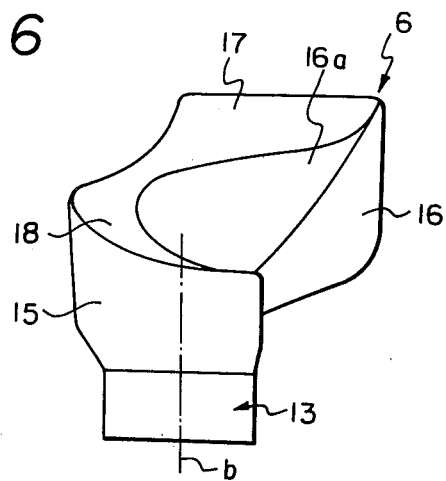
FIG. 6 is a side view in the direction of the arrow VI in FIG. 3.
Figure 7:
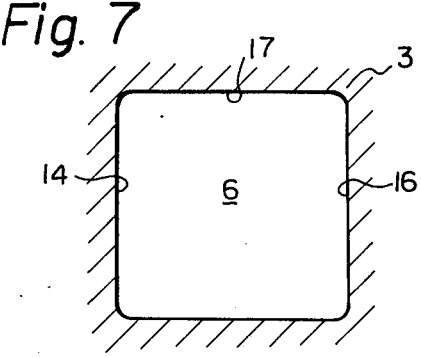
FIG. 7 is a cross-sectional view taken along the line VII—VII in FIG. 4.
Figure 9:
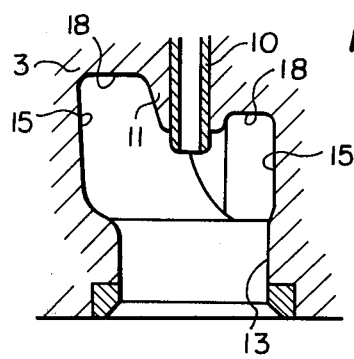
FIG. 9 is a cross-sectional view taken along the line IX—IX in FIG. 4.

As illustrated in FIGS. 6 and 9, the side wall 15 of the helical portion B is so formed that it expands outwards from the cylindrical inner wall of the mixture outlet portion 13. In addition, as is illustrated in FIG. 4, the side wall 15 is so formed that the distance R between the side wall 15 and the helix axis b is maintained constant at a position near the inlet passage portion A and is gradually reduced towards the helical direction C. The distance R is approximately equal to the radius of the cylindrical inner wall of the mixture outlet portion 13 at the helix terminating portion E.

Figure 8:
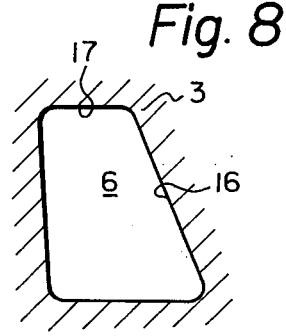
FIG. 8 is a cross-sectional view taken along the line VIII—VIII in FIG. 4.

The side wall 16 of the inlet passage portion A, which is located near the helix axis b, has; on its upper portion, an inclined wall portion 16a which is tilted downwards in the same manner as a corresponding inclined wall portion in our co-pending application Ser. No. 38,819, filed May 14, 1979. The width of the inclined wall portion 16a is gradually increased towards the helical portion B and, as is illustrated in FIG. 8, the entire portion of the side wall 16 is inclined at the connecting portion of the inlet passage portion A and the helical portion B. The upper half of the side wall 16 is smoothly connected to the circumferential wall of the cylindrical projection 11, and the lower half of the side wall 16 is connected to the side wall 15 of the helical portion B at the helix terminating portion E of the helical portion B.

Figure 5:
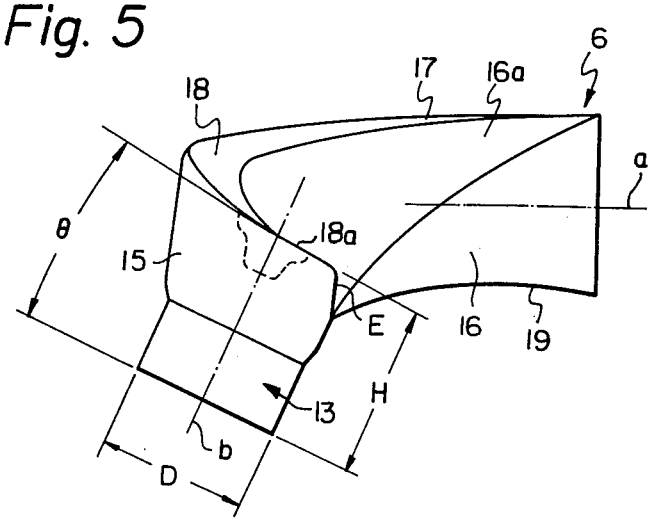
FIG. 5 is a side view in the direction of the arrow V in FIG. 3.

As is illustrated in FIGS. 1 and 5, the upper wall 17 of the inlet passage portion A extends substantially horizontally from the open inlet end of the inlet passage portion A towards the helical portion B and is smoothly connected to the upper wall 18 of the helical portion B. This upper wall 18 gradually descends towards the helical direction C (FIG. 4) and is connected to the side wall 16 of the inlet passage portion A. Since the inclined wall portion 16a of the inlet passage portion A is so formed that the width thereof is gradually increased towards the helical portion B as mentioned above, the width of the upper wall 17 of the inlet passage portion A is gradually reduced. In addition, since the side wall 15 of the helical portion B is so formed that the distance R between the side wall 15 and the helical axis b is maintained constant at a position near the inlet passage portion A and is gradually reduced towards the helical direction C as mentioned above, the width of the upper wall 18 of the helical portion B is gradually reduced towards the helical direction C. Consequently, it will be understood that the upper wall 17 of the inlet passage portion A extends substantially horizontally towards the helical portion B, while the width of the upper wall 17 is gradually reduced, and that the upper wall 18 of the helical portion B gradually descends towards the helical direction C, while the width of the upper wall 18 is gradually reduced.

As is illustrated in FIGS. 1 and 5, the bottom wall 19 of the inlet passage portion A extends substantially horizontally in parallel with the upper wall 17 towards the helical portion B and is connected to the cylindrical inner wall of the mixture outlet portion 13 via a smoothly curved wall 20 as illustrated in FIG. 1. From FIG. 4, it will be understood that the width of the bottom wall 19 is gradually reduced towards the helical portion B.

In operation, a part of the mixture introduced into the inlet passage portion A moves forward along the upper walls 17 and 18, as illustrated by the arrow K in FIG. 1, and the remaining part of the mixture impinges upon the inclined wall portion 16a and is deflected downwards. As a result, the remaining part of the mixture flows into the mixture outlet portion 13 without swirling, as illustrated by the arrow L in FIG. 1. Since the widths of the upper walls 17 and 18 are gradually reduced towards the flow direction of the mixture as mentioned above, the cross-section of the flow path of the mixture flowing along the upper walls 17 and 18 is gradually reduced towards the flow direction of the mixture. In addition, since the upper wall 18 gradually descends towards the helical direction C, the mixture flowing along the upper walls 17 and 18 is deflected downwards, while the velocity thereof is gradually increased. As a result of this, a swirl motion moving downwards while swirling is created in the helical portion B and this swirl motion causes a swirl motion of the mixture flowing into the mixture outlet portion 13, as illustrated by the arrow L in FIG. 1. Then the mixture moves downwards while smoothly swirling along the cylindrical inner wall of the mixture outlet portion 13 so that a strong swirl motion rotating about the helix axis b is created within the mixture outlet portion 13. This swirling mixture flows into the combustion chamber 4 via the valve gap formed between the intake valve 5 and its valve seat and causes a strong swirl motion in the combustion chamber 4.

In the helically-shaped intake port 6 according to the present invention, the mixture flowing along the upper walls 17 and 18 greatly contributes to the creation of a swirl motion. That is, if the downward inclination of the upper wall 18 of the helical portion becomes excessively large, since the mixture flowing along the upper wall 18 is sucked out into the combustion chamber 4 without swirling along the cylindrical inner wall of the mixture outlet portion 13, it is difficult to create a strong swirl motion.

Figure 10:
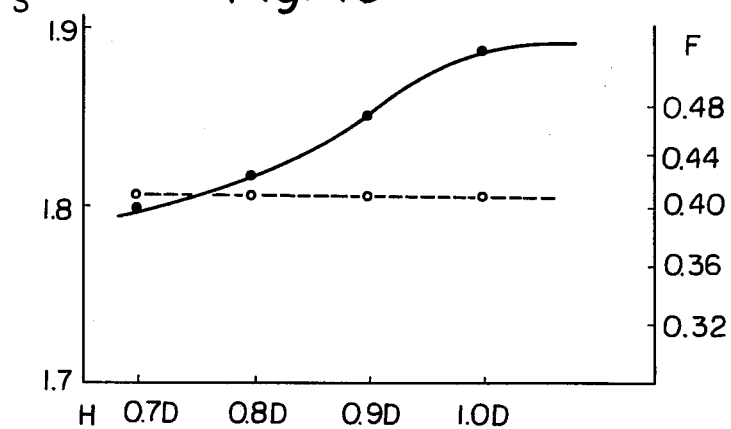
FIG. 10 is graph showing the number of revolutions of a swirl motion per a unit time and a flow coefficient of the helically-shaped intake port.

FIG. 10 shows the results of experiments conducted by changing the height H (FIG. 5) between the lower end of the mixture outlet portion 13 and the top of the helix terminating portion E. In FIG. 10, the ordinate S indicates the number of revolutions of a swirl motion per a unit time in the combustion chamber at a position near the outlet of the helically-shaped intake port in the case in which a predetermined amount of air is caused to flow within the helically-shaped intake port. The ordinate F indicates flow coefficient of the helically-shaped intake port 6, and the abscissa H indicates the height between the lower end of the mixture outlet portion 13 and the top of the helix terminating portion E. In addition, in FIG. 10, the solid curved line indicates the number of revolutions of a swirl motion per a unit time S, and the broken curved line indicates flow coefficient F. Furthermore, FIG. 10 shows the results of the experiments conducted by using a 4-cylinder internal combustion engine under a constant speed of 2000 r.p.m. and a wide open throttle valve. From FIG. 10, it will be understood that the number of revolutions of a swirl motion per a unit time, that is, the strength of the swirl motion, is increased as the height H is increased. In addition, from FIG. 10, it will also be understood that, if the height H is equal to or larger than the diameter D of the mixture outlet portion 13, the number of revolutions of a swirl motion per a unit time is maintained approximately constant, and that the height H has no influence on the flow coefficient F. Consequently, in order to create a strong swirl motion while ensuring a high volumetric efficiency, it is preferable that the height H be equal to or larger than the diameter D of the mixture outlet portion 13. However, it is necessary to avoid arranging the end portion 18a of the upper wall 18 to be inclined sharply upwards towards the helical direction C relative to the lower end face of the mixture outlet portion 13. As is illustrated in FIG. 5, it is preferable that the angle $\theta$ between the lower end face of the mixture outlet portion 13 and the surface of the end portion 18a of the upper wall 18 be less than 20 degrees.

By forming the end portion 18a of the upper wall 18 as mentioned above, it is possible to create a strong swirl motion. In addition, as mentioned previously, by forming the helically-shaped intake port so that the cross-section of the flow path of the mixture flowing along the upper walls 17 and 18 is gradually reduced towards the flow direction of the mixture, the flow velocity of the mixture is gradually increased and, as a result, it is possible to create a strong swirl motion in the combustion chamber 4 even if an engine is operating under a light load. In addition, by forming the inclined wall portion 16a as mentioned previously, since a part of the mixture introduced into the inlet passage portion A flows into the mixture outlet portion 13 along the smoothly curved wall 20 without swirling, the flow resistance which the mixture flowing in the helically-shaped intake port 6 is subjected to becomes considerably small as compared with that in a conventional helically shaped intake port. As a result of this, a high volumetric efficiency can be ensured when an engine is operating at a high speed under a heavy load.

According to the present invention, it is possible to create a strong swirl motion in the combustion chamber when an engine is operating under a light load, while ensuring a high volumetric efficiency when an engine is operating at a high speed under a heavy load.

While the invention has been described by reference to a specific embodiment chosen for purposes of illustration, it should be apparent that numerous modifications could be made thereto by those skilled in the art without departing from the spirit and scope of the invention.

What is claimed is:

1. A helically-shaped intake port of a spark-ignition internal combustion engine, which comprises: a helical portion having an open outlet end face; an intake valve arranged at said outlet end face, said helical portion being defined by an upper wall, an inner wall and a peripheral outer side wall which extends circumferentially about an axis of said intake valve; an inlet passage portion; a connecting portion tangentially connecting said inlet passage portion to said helical portion and having an open inlet end, said inlet passage portion being defined by an upper wall, a bottom wall, a first side wall arranged at a position near the axis of said intake valve, and having an inclined wall portion inclined in a direction such that the width of said inlet passage portion above the lower edge of the inclined wall portion at any point along said inlet passage portion is narrower than the width of said inlet passage portion below said inclined wall portion at said point and a second side wall arranged at a position remote from the axis of said intake valve and connected to the peripheral outer side wall of said helical portion; and a helix terminating portion, the upper wall of said helical portion extending to said helix terminating portion from the connecting portion, the height between said open outlet end face and the end portion of the upper wall of said helical portion, which is located at said helix terminating portion, being at least approximately as large as the diameter of said outlet end, the angle between the outlet end face and the end portion of the upper wall of said helical portion being less than about 20°.

2. A helically-shaped intake port as claimed in claim 1, wherein the upper wall of said helical portion gradually descends towards a flow direction of a sucked gas relative to a flat plane in which said outlet open end face is positioned.

3. A helically-shaped intake port as claimed in claim 1, wherein said helically-shaped intake port further comprises a valve guide projecting into said helical portion from the upper wall of said helical portion and having a circumferential wall, an upper part of said first side wall being tangentially connected to the circumferential wall of said valve guide, a lower part of said first side wall being connected to the peripheral outer side wall of said helical portion.

4. A helically-shaped intake port as claimed in claim 1, wherein the second side wall of said inlet passage portion is arranged so as to be substantially vertical.

5. A helically-shaped intake port as claimed in claim 1, wherein a longitudinal axis of said inlet passage portion extends so as to be slightly curved.

6. A helically-shaped intake port as claimed in claim 1, wherein the width of the upper wall of said inlet passage portion is gradually reduced towards said helical portion.

7. A helically-shaped intake port as claimed in claim 1, wherein the width of the upper wall of said helical portion is gradually reduced towards a flow direction of a sucked gas.

8. A helically-shaped intake port as claimed in claim 1, wherein the peripheral side wall of said helical portion is expanded outwards from a periphery of said outlet open end face.

9. A helically-shaped intake port as claimed in claim 1, wherein the width of said inclined wall portion is gradually increased towards said helical portion.

10. A helically-shaped intake port as claimed in claim 9, wherein the entire portion of said first side wall is inclined at a position wherein said inlet passage portion is tangentially connected to said helical portion.

11. A helically-shaped intake port as claimed in claim 1, wherein the bottom wall of said inlet passage portion is smoothly connected to an inner wall of said helical portion, which is located at a position near said outlet open end face.

12. A helically-shaped intake port as claimed in claim 11, wherein the width of the bottom wall of said inlet passage portion is gradually reduced towards said helical portion.

* * * * *

UNITED STATES PATENT AND TRADEMARK OFFICE
CERTIFICATE OF CORRECTION

PATENT NO. : 4,312,309

DATED : January 26, 1982

INVENTOR(S) : Kiyoshi Nakanishi, et al.

It is certified that error appears in the above—identified patent and that said Letters Patent is hereby corrected as shown below:

Col. 1, line 40, after "extends" change "circumt-" to --circumf--.

Col. 1, line 42, after "portion" correct spelling of "tangentially"

Col. 1, line 53, after "portion" delete ",".

Col. 1, line 55, after "end." begin new paragraph, and insert --The present invention may be more fully understood-- before "from the"

Col. 2, line 13, after "Fig. 10 is" insert --a--.

Col. 3, line 4, after "has" change ";" to --,--.

Col. 5, line 17, between "cally" and "shaped" insert a --hyphen--.

Signed and Sealed this

Eighteenth Day of May 1982

[SEAL]

Attest:

GERALD J. MOSSINGHOFF

Attesting Officer

Commissioner of Patents and Trademarks